United States Patent
Funakoshi et al.

(10) Patent No.: US 8,282,529 B2
(45) Date of Patent: Oct. 9, 2012

(54) TRANSMISSION OIL-PRESSURE CONTROL APPARATUS AND METHODS

(75) Inventors: Hidekazu Funakoshi, Isehara (JP); Hiroaki Akazawa, Zama (JP); Masahiko Kikuchi, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 168 days.

(21) Appl. No.: 12/811,880

(22) PCT Filed: Feb. 25, 2009

(86) PCT No.: PCT/IB2009/000344
§ 371 (c)(1),
(2), (4) Date: Jul. 7, 2010

(87) PCT Pub. No.: WO2009/106956
PCT Pub. Date: Sep. 3, 2009

(65) Prior Publication Data
US 2010/0294065 A1    Nov. 25, 2010

(30) Foreign Application Priority Data
Feb. 26, 2008  (JP) ................................. 2008-043813

(51) Int. Cl.
*B60W 10/02*  (2006.01)
*B60W 10/10*  (2012.01)
(52) U.S. Cl. .......................................... 477/79; 477/180
(58) Field of Classification Search .................... 477/70, 477/79, 86
See application file for complete search history.

(56) References Cited

U.S. PATENT DOCUMENTS

| | | | | |
|---|---|---|---|---|
| 5,853,076 A | * | 12/1998 | McKee et al. | 192/85.63 |
| 6,955,629 B2 | * | 10/2005 | Nishida et al. | 477/143 |
| 7,039,516 B2 | * | 5/2006 | Yamaguchi et al. | 701/51 |
| 7,431,678 B2 | * | 10/2008 | Takagi | 477/180 |

FOREIGN PATENT DOCUMENTS

| | | |
|---|---|---|
| JP | 11-227486 A | 8/1999 |
| JP | 2001-311462 A | 11/2001 |
| JP | 2004-197758 A | 7/2004 |
| JP | 2004-301200 A | 10/2004 |
| JP | 2005-273879 A | 10/2005 |

OTHER PUBLICATIONS

International Search Report issued in PCT/IB2009/000344, mailed on Jun. 23, 2009, 2 pages.
International Preliminary Report on Patentability issued in PCT/IB2009/000344, mailed on Sep. 10, 2010 (6 pages).
Japanese Office Action issued in corresponding Japanese Application No. 2008-043813 dated Jul. 17, 2012 (3 pages).

* cited by examiner

*Primary Examiner* — Edwin A Young
(74) *Attorney, Agent, or Firm* — Osha Liang LLP (57) ABSTRACT

A control apparatus of a vehicle transmission includes a hydraulic circuit configured to activate at least one friction element with a control pressure, a selector configured to select a range of the transmission, a valve configured to switch a transmission shifter, and a control unit configured to direct the valve to switch the transmission shifter in response to the selected transmission range and to reduce the control pressure prior to switching the transmission shifter. A method to control a vehicle transmission includes activating at least one friction element with a control pressure, selecting a desired range of the transmission, switching a transmission range in response to the selected desired transmission range, and reducing the control pressure prior to switching the transmission range.

20 Claims, 5 Drawing Sheets

TRANSMISSION OIL-PRESSURE CONTROL APPARATUS AND METHODS

CROSS-REFERENCE TO RELATED APPLICATIONS

The present application claims priority from Japanese Patent Application No. 2008-043813, filed Feb. 26, 2008. The contents of the priority application are hereby incorporated by reference in their entirety.

BACKGROUND OF THE DISCLOSURE

1. Field of the Disclosure

The present disclosure is applicable to any type of automatic transmission (for example, a continuously variable transmission, a multi-range transmission, an automatic manual transmission, which is a manual transmission that involves the use of automatic gear shifts, etc.). More specifically, the present disclosure relates to a shifting oil-pressure control apparatus for an automatic transmission which may provide improved controllability and responsiveness of a shifting oil pressure when a selection operation for switching between a driving range and a non-driving range is performed by a driver.

2. Description of the Related Art

In an automatic transmission, a park (P) range, a reverse (R) range, a neutral (N) range, a forward automatic gear-shift (D) range, etc., which designate gear-shift modes, are arranged in that order. When a selection operation for manually switching between the above-mentioned ranges is performed, a manual valve is operated in response to the selection operation. More specifically, the manual valve is moved to a position corresponding to the selected range, thereby setting a gear-shift mode that corresponds to the selected range.

As described in, for example, Japanese Unexamined Patent Application Publication No. 2004-197758, the manual valve is operated in response to the selection operation for switching between the ranges in the following manner. That is, a shift lever used by the driver to select one of the ranges is mechanically connected to the manual valve with a link mechanism, a wire, etc., and the manual valve is operated in response to the selection operation by the mechanical means.

In addition, as described in Japanese Unexamined Patent Application Publication No. 2004-197758, because the above-mentioned ranges are successively arranged, the manual valve has a reverse (R) range position, which is a driving range position, and a forward automatic gear-shift (D) range position, which is another driving range position, at one and the other side of a neutral (N) range position, which is a non-driving range position. At the neutral (N) range position, a reverse shifting hydraulic circuit for a reverse shifting friction element, which is to be set to an engaged state when a selection operation for switching from the neutral (N) range to the reverse (R) range is performed, is disconnected from a line pressure circuit and is connected to a drain port. In addition, a forward shifting hydraulic circuit for a forward shifting friction element, which is to be set to an engaged state when a selection operation for switching from the neutral (N) range to the forward automatic gear-shift (D) range is performed, is also disconnected from the line pressure circuit and connected to a drain port. Accordingly, the reverse shifting friction element and the forward shifting friction element are set to a disengaged state and the automatic transmission is set to a state in which power cannot be transmitted (neutral state).

At the reverse (R) range position or the forward automatic gear-shift (D) range position, the reverse shifting hydraulic circuit for the reverse shifting friction element or the forward shifting hydraulic circuit for the forward shifting friction element is disconnected from the drain port and is connected to the line pressure circuit. Accordingly, the reverse shifting friction element or the forward shifting friction element is set to an engaged state by a line pressure and the automatic transmission is set to a state in which reverse rotational power or forward rotational power can be transmitted.

In the case where the manual valve having the above-described structure is mechanically operated in response to the selection operation, as described in Japanese Unexamined Patent Application Publication No. 2004-197758, the following procedure is performed. That is, when a selection operation for switching from the reverse (R) range or the forward automatic gear-shift (D) range to the neutral (N) range is performed, the reverse shifting friction element or the forward shifting friction element, which has been in the engaged state, is disengaged to set the automatic transmission to the neutral state. At this time, a flow-rate regulator, such as an orifice, is often provided in the drain port for draining the shifting hydraulic circuit for the corresponding shifting friction element, so that the engagement-pressure reduction rate of the corresponding shifting friction element can be adjusted.

However, when the engagement-pressure reduction rate of the shifting friction element is adjusted by regulating the flow rate with the orifice or the like, the engagement-pressure reduction rate of the shifting friction element is exclusively determined by the degree of flow-rate regulation provided by the orifice. Accordingly, the engagement-pressure reduction rate cannot be actively controlled.

When the above-described R→N selection operation or D→N selection operation is performed, the engagement pressure of the corresponding shifting friction element is preferably eliminated as soon as possible without causing a problem of disengagement shock (R→N selection shock or D→N selection shock). An engagement-pressure reduction rate and an engagement-pressure reduction pattern for achieving this differ depending on the driving conditions. If the engagement-pressure reduction rate of the shifting friction element is exclusively determined by the degree of flow-rate regulation performed by the orifice or the like, the demand regarding the selection shock and the demand regarding the selection response, which conflict each other, cannot be satisfied at the same time in a well-balanced manner.

In addition, in an R→N→D selection operation in which the range is switched to the D range immediately after the R→N selection operation or in a D→N→R selection operation in which the range is switched to the R range immediately after the selection operation, the following problems occur in addition to the above-described problems.

That is, when the manual valve is mechanically moved to the D range position or the R range position in response to the N→D selection operation or the N→R selection operation, the manual valve causes the line pressure to be directly applied to the forward shifting friction element or the reverse shifting friction element to set the forward shifting friction element or the reverse shifting friction element to the engaged state. Therefore, the forward shifting friction element or the reverse shifting friction element is too quickly set to the engaged state and there is a risk that an engagement shock (selection shock) will occur.

Therefore, as described in Japanese Unexamined Patent Application Publication No. 2004-197758, a flow-rate regulator, such as an orifice, is often provided in the shifting hydraulic circuit for each shifting friction element, so that the shifting oil pressure increase rate (rate at which the engagement of the corresponding shifting friction element progresses) can be adjusted.

The rate at which the engagement of the corresponding shifting friction element progresses (selection response) is preferably set as high as possible without causing an engagement shock (selection shock) of the shifting friction element. An engagement-pressure increase rate and an engagement-pressure increase pattern for achieving this differ depending on the driving conditions. If the engagement-pressure increase rate of each shifting friction element is exclusively determined by the degree of flow-rate regulation performed by the orifice or the like as described in Japanese Unexamined Patent Application Publication No. 2004-197758, the demand regarding the selection shock and the demand regarding the selection response, which conflict each other, cannot be satisfied at the same time in a well-balanced manner.

To solve all of the above-described problems, each of the shifting hydraulic circuit for the forward shifting friction element and the shifting hydraulic circuit for the reverse shifting friction element may have a shifting oil-pressure control valve capable of individually controlling the shifting oil pressure (engagement pressure of the shifting friction element) of the shifting hydraulic circuit.

In such a case, the shifting oil pressure of the forward shifting friction element (engagement pressure of the forward shifting friction element) and the shifting oil pressure of the reverse shifting friction element (engagement pressure of the reverse shifting friction element) can be individually controlled.

However, in this case, two oil pressure control valves, that is, a forward-shifting oil-pressure control valve for controlling the forward shifting oil pressure of the forward shifting friction element (engagement pressure of the forward shifting friction element) and a reverse-shifting oil-pressure control valve for controlling the reverse shifting oil pressure of the reverse shifting friction element (engagement pressure of the reverse shifting friction element) are necessary. Because oil-pressure control valves are expensive compared to directional control valves, high costs are incurred.

What is needed is an apparatus that may dampen the pressure when the transmission is switched, shifted, or launched. What is further needed is a single common oil-pressure control valve that may be used as both the forward-shifting oil-pressure control valve and the reverse-shifting oil-pressure control valve, such that a controlled pressure provided by the common oil-pressure control valve may be selectively supplied to the forward shifting friction element or the reverse shifting friction element under distribution control performed by the manual valve.

In such a case, the costs can be reduced because the number of expensive oil-pressure control valves is reduced to one. However, the engagement-pressure reduction rate and the engagement-pressure reduction pattern of the shifting friction elements are constant. In addition, because the oil-pressure control valve starts a pressure adjusting operation after switching of the manual valve is detected, the above-described problems cannot be solved. In addition, when the N→D selection operation or the N→R selection operation is performed, the common oil-pressure control valve supplies the engagement oil pressure (shifting oil pressure) to the forward shifting friction element or the reverse shifting friction element from the state in which the oil pressure is 0. This increases the delay in the engagement response of the shifting friction elements, and a new problem occurs in that the shifting response is degraded.

SUMMARY OF THE CLAIMED SUBJECT MATTER

In one aspect, the present disclosure relates to a control apparatus of a vehicle transmission including a hydraulic circuit configured to activate at least one friction element with a control pressure a selector configured to select a range of the transmission, a valve configured to switch a transmission shifter, and a control unit configured to direct the valve to switch the transmission shifter in response to the selected transmission range and to reduce the control pressure prior to switching the transmission shifter.

In another aspect, the present disclosure relates to a method to control a vehicle transmission including activating at least one friction element with a control pressure, selecting a desired range of the transmission, switching a transmission range in response to the selected desired transmission range, and reducing the control pressure prior to switching the transmission range.

In another aspect, the present disclosure relates to a control apparatus of a transmission including a hydraulic circuit configured to activate at least one friction element with a control pressure, a means for selecting a range of the transmission, a means for shifting a transmission, and a means for directing the valve means to switch the transmission shifter in response to the selected transmission range, and a means for reducing the control pressure prior to switching the means for shifting.

BRIEF DESCRIPTION OF DRAWINGS

Features of the present disclosure will become more apparent from the following description in conjunction with the accompanying drawings.

DETAILED DESCRIPTION

Embodiments of the present disclosure will be described in detail below with reference to the drawings.

Figure 1:
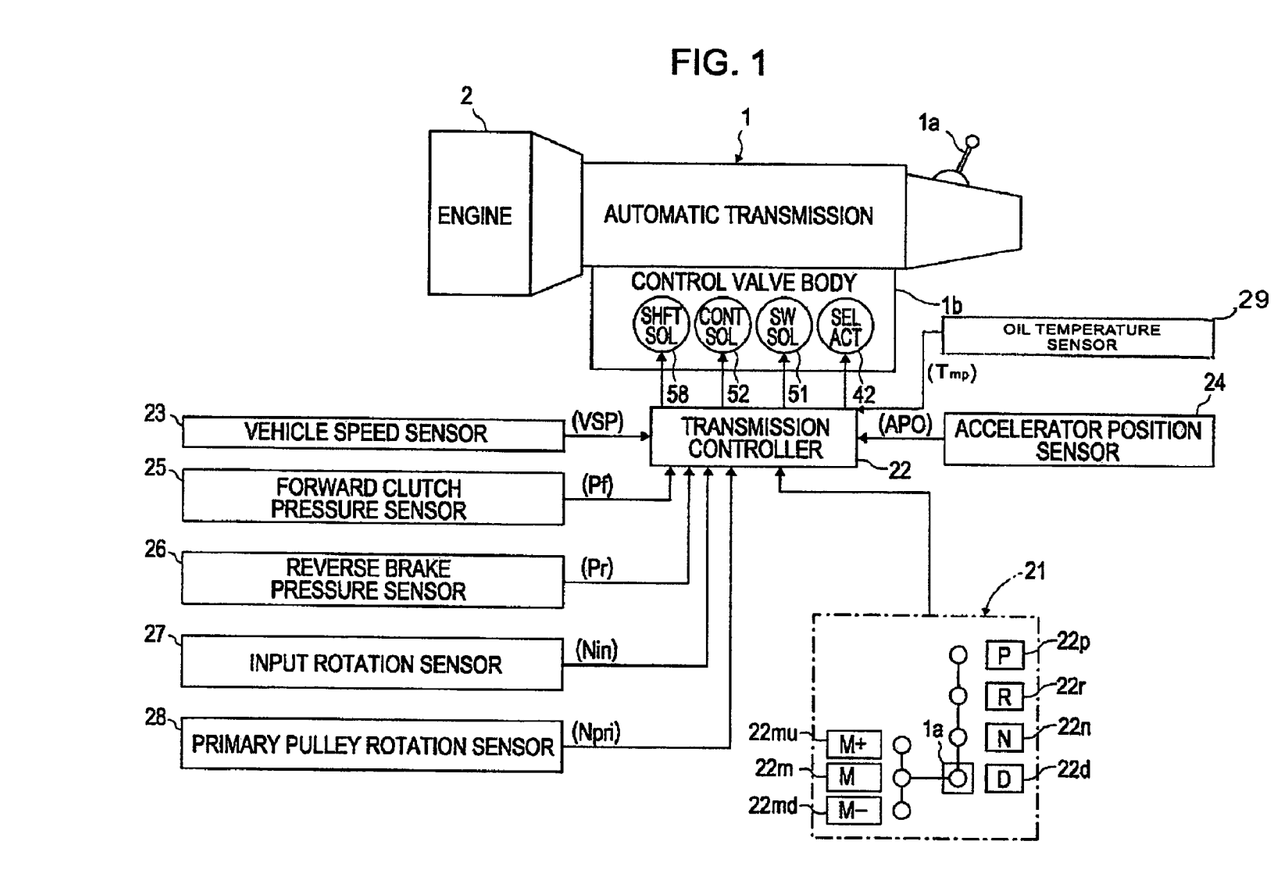
FIG. 1 is a schematic system diagram illustrating a control system of an automatic transmission having a shifting oil-pressure control, in accordance with embodiments of the present disclosure.

Referring to FIG. 1, a control system of an automatic transmission 1 having a shifting oil-pressure control apparatus according to embodiments of the present disclosure, is shown. The automatic transmission 1 has an engine 2 connected thereto at a left end thereof in the figure (at an input side), and outputs the rotation of the engine 2 after changing the rotational speed in accordance with the selected transmission gear ratio.

As shown, the automatic transmission 1 is a V-belt type continuously variable transmission (see FIG. 2), but it should be understood that any type of automatic transmission may be used with embodiments disclosed herein. Automatic transmisstion 1 may include an input shaft 3 to which the rotation of the engine 2 may be input through a lock-up torque converter T/C, a forward-reverse switching mechanism 4, a V-belt power transmission mechanism 5, and a differential gear mechanism 6.

Figure 2:
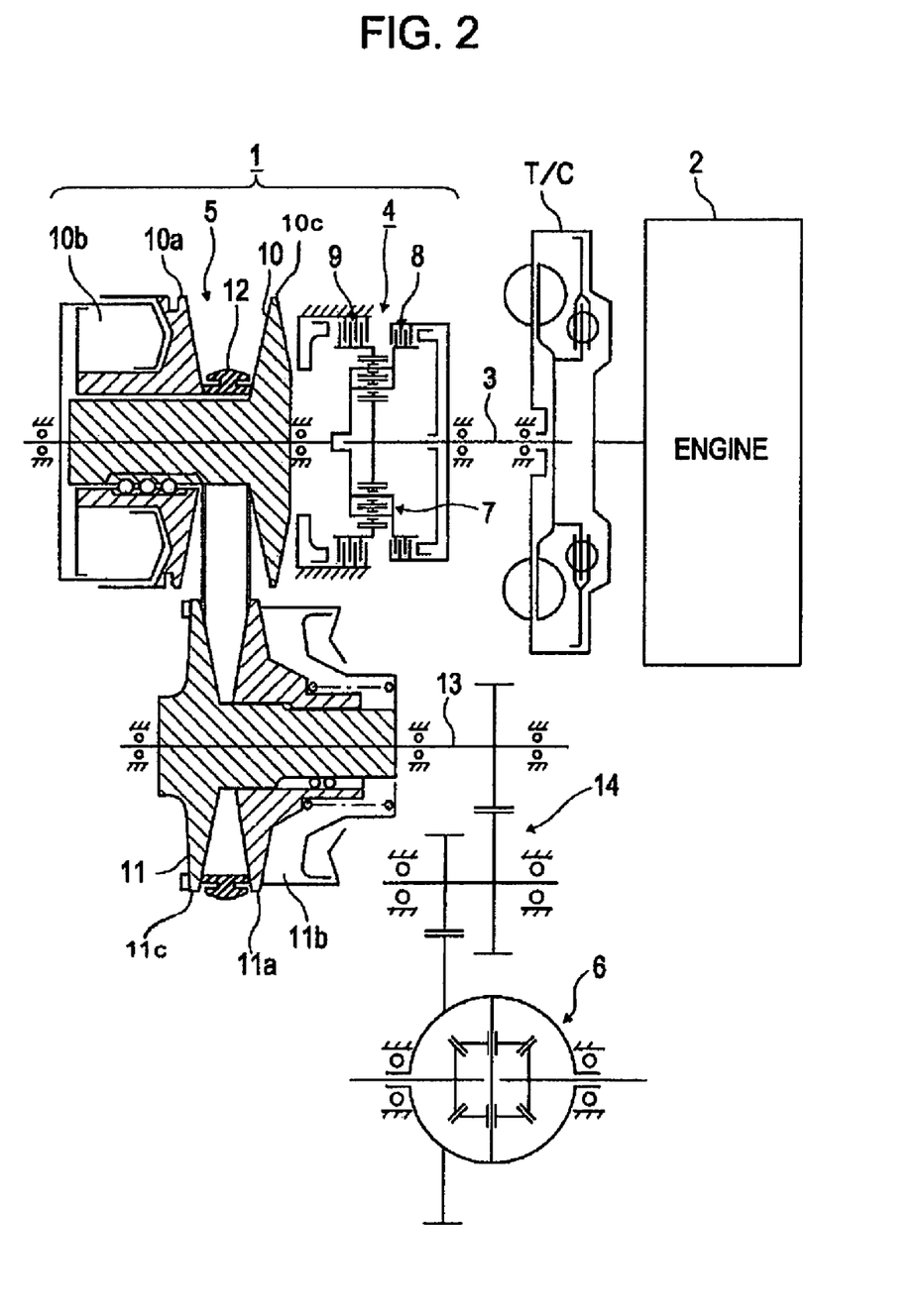
FIG. 2 is a schematic vertical sectional view illustrating a power transmission system in the automatic transmission shown in FIG. 1, in accordance with embodiments of the present disclosure.

The forward-reverse switching mechanism 4 may include a double pinion planetary gear set 7. When a forward clutch 8, which may function as a forward shifting friction element, is in an engaged state, the rotation of the input shaft 3 may be directly transmitted to the V-belt power transmission mechanism 5. When a reverse brake 9, which may function as a reverse shifting friction element, is in an engaged state, the rotation of the input shaft 3 may be transmitted to the V-belt power transmission mechanism 5 after the direction of rotation is reversed. When both the forward clutch 8 and the reverse brake 9 are in a disengaged state, the rotation of the input shaft 3 may not be transmitted to the V-belt power transmission mechanism 5.

The V-belt power transmission mechanism 5 may include a primary pulley 10, which may be a driving pulley to which the rotation from the forward-reverse switching mechanism 4 may be input, a secondary pulley 11, which may be a driven pulley, and a V belt 12 that may be stretched between the pulleys 10 and 11.

The primary pulley 10 may rotate a movable flange 10a together with another stationary flange 10c, and the secondary pulley 11 may rotate a movable flange 11a together with another stationary flange 11c. The flanges 10a and 11a may be movable in an axial direction, and the positions of the movable flanges 10a and 11a may be controlled by a difference between pressures in cylinder chambers 10b and 11b.

The V-belt power transmission mechanism 5 may transmit the rotation of the primary pulley 10 to the secondary pulley 11 and the output shaft 13 through the V belt 12.

During the power transmission, a line pressure, which may be a transmission control source pressure corresponding to a transmission input torque, may be supplied to the cylinder chamber 11b of the secondary pulley 11. In addition, a transmission control pressure, which may be determined by a transmission control valve, may be supplied to the cylinder chamber 10b of the primary pulley 10 by using the line pressure as the source pressure. The positions of the movable flanges 10a and 11a may be controlled in accordance with the ratio of the transmission control pressure in the cylinder chamber 10b of the primary pulley 10 to the line pressure in the cylinder chamber 11b of the secondary pulley 11, and a looped arc diameter of the V belt 12 stretched between the pulleys 10 and 11, that is, the transmission ratio between the pulleys 10 and 11 may be controlled accordingly.

Thus, the V-belt power transmission mechanism 5 may be capable of continuously changing the transmission gear ratio from a lowest-speed transmission gear ratio to a high-speed transmission gear ratio (upshifting) by increasing the transmission control pressure (primary pulley pressure). Similarly, the V-belt power transmission mechanism 5 may be capable of continuously changing the transmission gear ratio toward the lowest-speed transmission gear ratio (downshifting) by reducing the transmission control pressure (primary pulley pressure).

The rotation transmitted from the V-belt power transmission mechanism 5 to the output shaft 13 may be input to the differential gear mechanism 6 through a gear pair 14 with parallel axes. The differential gear mechanism 6 may cause the vehicle to drive by differentially driving left and right driving wheels (not shown) of the vehicle.

Referring to FIGS. 1 and 2 together, a schematic vertical sectional view illustrating a power transmission system is shown. The V-belt type continuously variable transmission 1 may include a selector lever 1a for selecting a gear-shift mode or performing a manual gear shift.

The selector lever 1a may be arranged so as to extend through a vehicle floor tunnel (not shown) and may be positioned near a driver's seat. A driver may select a gear-shift mode or performs a manual gear shift by manually operating the selector lever 1a in accordance with an operation pattern 21.

The operation pattern 21 of the selector lever 1a may include a P range position for setting the V-belt type continuously variable transmission 1 to the park (P) range; a R range position for setting the V-belt type continuously variable transmission 1 to the reverse (R) range; a N range position for setting the V-belt type continuously variable transmission 1 to the neutral (N) range; a D range position for setting the V-belt type continuously variable transmission 1 to the forward automatic gear-shift (D) range; and a M range position for setting the V-belt type continuously variable transmission 1 to a manual gear shift (M) range.

Broadly, shifting may include the operation where the car transmission may switch from one mode while in motion to another. For example, shifting may include the situation where the car is in D, is switched to N, and then switched back to D. Comparatively, a "launching" operation may apply to a situation where the transmission switches from a rest position to another position. For example, launching may apply to the situation where the car transmission switches from N to D, or R when at rest.

At the M range position, a manual upshift (M+) position for commanding a manual upshift and a manual downshift (M−) position for commanding a manual downshift may be selected.

The P range position, the R range position, the N range position, and the D range position may be arranged in that order along a straight line, and the M range position may be disposed adjacent to the D range position in a direction away from the straight line.

The manual upshift (M+) position and the manual downshift (M−) position may be arranged with the M range position therebetween along a direction parallel to the direction in which the P range position, the R range position, the N range position, and the D range position may be arranged.

When the driver applies an operational force for moving the selector lever 1a to the manual upshift (M+) position or the manual downshift (M−) position and then releases the selector lever 1a, the selector lever 1a may return to the M range position by itself.

The selector-lever operation pattern 21 may have a P-range switch 22p that may output a P-range signal when the selector lever 1a is at the P range position; a R-range switch 22r that may output a R-range signal when the selector lever 1a is at the R range position; an N-range switch 22n that may output an N-range signal when the selector lever 1a is at the N range position; a D-range switch 22d that may output a D-range signal when the selector lever 1a is at the D range position; a M-range switch 22m that may output an M-range signal when the selector lever 1a is at the M range position; a manual upshift switch 22mu that may output a manual upshift (M+) signal when the selector lever 1a is at the manual upshift (M+) position; and a manual downshift switch 22md that may output a manual downshift (M−) signal when the selector lever 1a is at the manual downshift (M−) position.

Figure 3:
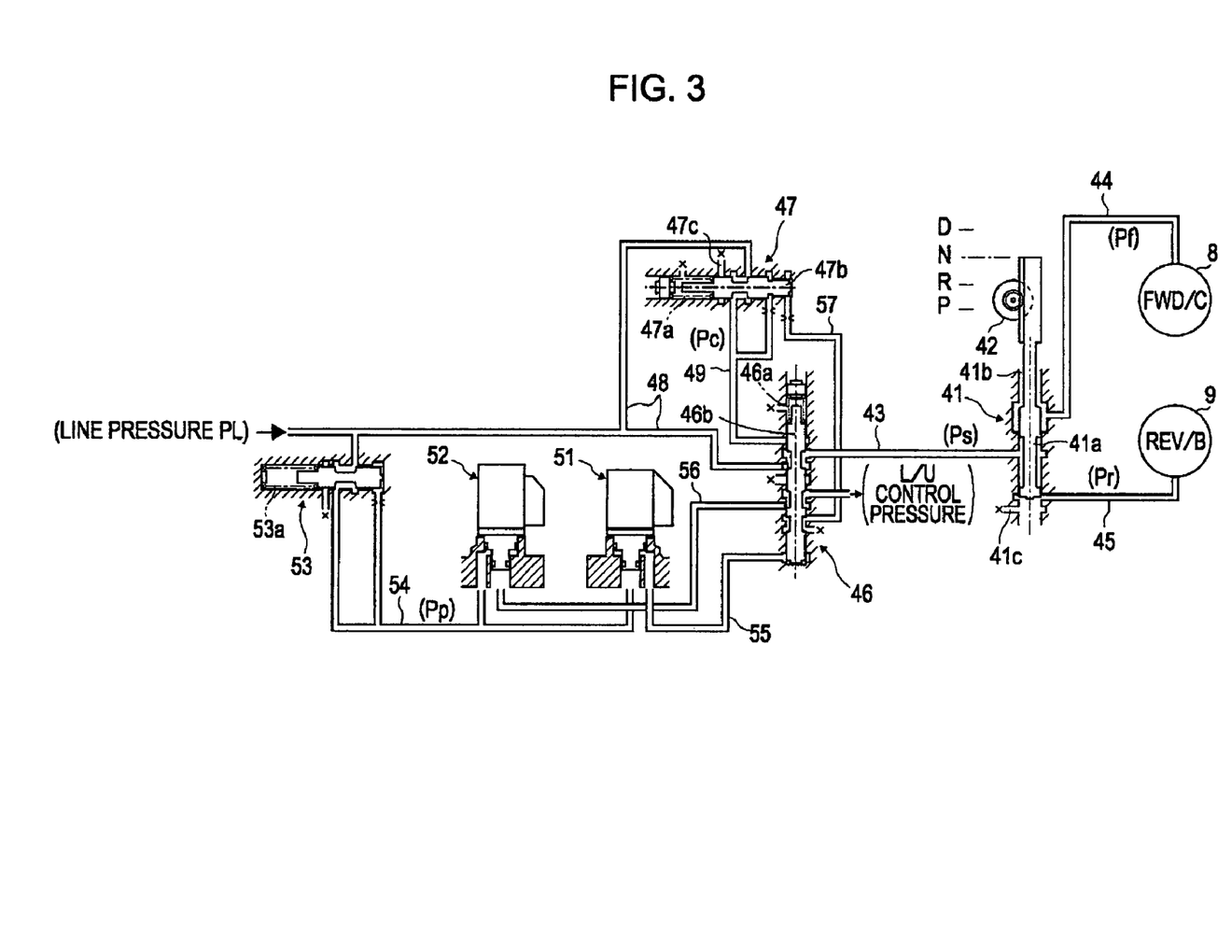
FIG. 3 is a hydraulic circuit diagram illustrating a shifting oil-pressure control section in the automatic transmission shown in FIG. 2, in accordance with embodiments of the present disclosure.

Referring to FIG. 3, a hydraulic circuit diagram illustrating a shifting oil-pressure control section in the automatic transmission shown in FIG. 2, is shown. In an embodiment, a shifting oil-pressure control circuit that may perform a shifting oil-pressure control operation may include an engaging-and-disengaging control operation for the forward clutch 8 and the reverse brake 9 in the V-belt type continuously variable transmission 1.

A manual valve 41 may operate in response to a range-switching operation (selection operation) performed using the selector lever 1a. The manual valve 41 and the selector lever 1a may not be mechanically connected to each other. Instead, the manual valve 41 may be electronically controlled so as to operate in response to the selection operation performed using the selector lever 1a.

Therefore, the manual valve 41 may have a park (P) range position, a reverse (R) range position, a neutral (N) range position, and a forward automatic gear-shift (D) range position (same as M range position), which may be arranged next to each other. The manual valve 41 may include a spool 41a that may be electronically controlled by a selection actuator 42 so as to move to the above-mentioned range positions.

The manual valve 41 may be connected to a selection hydraulic circuit 43 so that a selection oil pressure Ps may be supplied to a forward shifting hydraulic circuit 44 for the forward clutch 8 and a reverse shifting hydraulic circuit 45 for the reverse brake 9. A connecting portion of the forward shifting hydraulic circuit 44 and a connecting portion of the reverse shifting hydraulic circuit 45 may be arranged on one and the other side of a connecting portion of the selection hydraulic circuit 43 in the axial direction of the manual valve 41. Thus, both of the forward shifting hydraulic circuit 44 and the reverse shifting hydraulic circuit 45 may not need any type of flow-rate regulator (e.g., such as an orifice, etc.).

Continuing with FIG. 3, when the manual valve 41 is at the neutral (N) range position, the selection hydraulic circuit 43 may be connected to a closed space between lands of the spool 41a so that the selection hydraulic circuit 43 may be completely closed. In addition, the forward shifting hydraulic circuit 44 and the reverse shifting hydraulic circuit 45 may be connected to drain ports 41b and 41c, respectively, so that a forward shifting oil pressure Pf, which may be an engagement pressure of the forward clutch 8, and a reverse shifting oil pressure Pr, which may be an engagement pressure of the reverse brake 9, may be released through the drain ports 41b and 41c. Thus, both the forward clutch 8 and the reverse brake 9 may be set to a disengaged state and the V-belt type continuously variable transmission 1 may be set to a neutral state in which power may not be transmitted.

When the manual valve 41 is at the forward automatic gear-shift (D) range position, the forward shifting hydraulic circuit 44 may be disconnected from the drain port 41b and may be connected to the selection hydraulic circuit 43 so that the selection oil pressure Ps may be supplied to the forward clutch 8. As a result, the forward shifting oil pressure Pf, which may be the engagement pressure of the forward clutch 8, may be generated and the forward clutch 8 may be set to an engaged state. At this time, the reverse shifting hydraulic circuit 45 may be continuously connected to the drain port 41c, so that the reverse shifting oil pressure Pr, which may be the engagement pressure of the reverse brake 9, may be released through the drain port 41c and the reverse brake 9 may be set to the disengaged state. Thus, the V-belt type continuously variable transmission 1 may be set to a state in which forward rotational power may be transmitted.

When the manual valve 41 is at the reverse (R) range position, the reverse shifting hydraulic circuit 45 may be disconnected from the drain port 41c and may be connected to the selection hydraulic circuit 43 so that the selection oil pressure Ps may be supplied to the reverse brake 9. As a result, the reverse shifting oil pressure Pr, which may be the engagement pressure of the reverse brake 9, may be generated and the reverse brake 9 may be set to an engaged state. At this time, the forward shifting hydraulic circuit 44 may be continuously connected to the drain port 41b, so that the forward shifting oil pressure Pf, which may be the engagement pressure of the forward clutch 8, may be released through the drain port 41b and the forward clutch 8 may be set to the disengaged state. Thus, the V-belt type continuously variable transmission 1 may be set to a state in which reverse rotational power may be transmitted.

When the spool 41a of the manual valve 41 is moved further downward beyond the reverse (R) range position and reaches the park (P) range position, the upper land of the spool 41a may block the selection hydraulic circuit 43. In addition, the forward shifting hydraulic circuit 44 and the reverse shifting hydraulic circuit 45 may be connected to the drain ports 41b and 41c, respectively, such that the forward shifting oil pressure Pf, which may be the engagement pressure of the forward clutch 8, and the reverse shifting oil pressure Pr, which may be the engagement pressure of the reverse brake 9, may be released through the drain ports 41b and 41c. Thus, both the forward clutch 8 and the reverse brake 9 may be set to a disengaged state and the V-belt type continuously variable transmission 1 may be set to a neutral state in which power may not be transmitted.

To generate the selection oil pressure Ps, a selection switch valve 46 and a selection control valve 47 may be provided. The selection control valve 47 may receive a line pressure PL, which may be a transmission control source pressure corresponding to a transmission input torque, from a line-pressure circuit 48 and may generate a control pressure Pc by adjusting the line pressure PL. The control pressure Pc may be output to a control pressure circuit 49. The selection switch valve 46 may select one of the line pressure PL from the circuit 48 and the control pressure Pc from the circuit 49 as the selection oil pressure Ps, and may output the selection oil pressure Ps to the circuit 43.

A selection switch solenoid 51 may be provided for switching the selection switch valve 46. A selection control solenoid 52 may be provided for controlling the pressure-adjusting operation performed by the selection control valve 47. In addition, a pilot valve 53 may be provided for generating a pilot pressure Pp as an input pressure applied to the solenoids 51 and 52. The pilot valve 53 may serve to output a constant pilot pressure Pp to a pilot pressure circuit 54 by reducing the line pressure PL of the circuit 48 to a constant pressure corresponding to a set load that may be applied by a built-in spring 53a.

The selection switch solenoid 51 may be electronically controlled so as to determine whether or not the pilot pressure Pp from the circuit 54 may be supplied to the bottom end of the selection switch valve 46 through a circuit 55. When the selection switch solenoid 51 is OFF and the pilot pressure Pp is not supplied to the bottom end of the selection switch valve 46 through the circuit 55, a spool 46b of the selection switch valve 46 may be moved by a built-in spring 46a to a line-pressure selection position, as depicted in FIG. 3. Accordingly, the selection hydraulic circuit 43 may be connected to the line pressure circuit 48 and the selection oil pressure Ps may be set to be equal to the line pressure PL.

When the selection switch solenoid 51 is ON and the pilot pressure Pp is supplied to the bottom end of the selection switch valve 46 through the circuit 55, the spool 46b of the selection switch valve 46 may be moved against the force applied by the built-in spring 46a to a control-pressure selection position which may be positioned as shown by FIG. 3. Accordingly, the selection hydraulic circuit 43 may be connected to the control pressure circuit 49 and the selection oil pressure Ps may be set to be equal to the control pressure Pc.

The control pressure Pc may be generated by the selection control valve 47 in accordance with the solenoid pressure that may be applied from the selection control solenoid 52. The selection control solenoid 52 may use the constant pilot pressure Pp as a source pressure and may output a solenoid pressure that may increase along with the duty ratio to the circuit 56.

As shown by FIG. 3, when the spool 46b of the selection switch valve 46 is moved upward from the position and is at a control pressure selection position, the above-mentioned solenoid pressure in the circuit 56 may be supplied to the right end of the selection control valve 47 through a circuit 57. The selection control valve 47 may include a spool 47b that may be elastically retained by a spring 47a at a position in a normal state. While the spool 47b is positioned as shown, the line pressure circuit 48 may be connected to the control pressure circuit 49 and the control pressure Pc of the circuit 49 may increase.

The control pressure Pc may be fed back to the selection control valve 47 such that the spool 47b may be pushed against the force applied by the spring 47a. In addition, the solenoid pressure from the circuit 57 may also be supplied to the spool 47b so that the spool 47b may be pushed against the force applied by the spring 47a.

Therefore, as the control pressure Pc increases as described above, the spool 47b may move leftward from its depicted position as a result of the control pressure Pc and the solenoid pressure from the circuit 57. When the spool 47b moves leftward, the degree of communication between the control pressure circuit 49 and the line pressure circuit 48 may decrease, and the degree of communication between the control pressure circuit 49 and a drain port 47c may increase.

When the control pressure Pc further increases, the spool 47b may move further leftward and the degree of communication between the control pressure circuit 49 and the drain port 47c may exceed the degree of communication between the control pressure circuit 49 and the line pressure circuit 48. As a result, the control pressure Pc may decreases and the spool 47b may stop moving leftward.

Conversely, when the control pressure Pc decreases, the spool 47b may be moved rightward by the spring 47a. When the spool 47b moves rightward, the degree of communication between the control pressure circuit 49 and the line pressure circuit 48 may exceed the degree of communication between the control pressure circuit 49 and the drain port 47c. As a result, the control pressure Pc may increase and the spool 47b may stop moving rightward.

As a result of the above-described operation, the control pressure Pc may be adjusted to a pressure at which the rightward force applied to the spool 47b by the spring 47a may balance with the leftward force applied to the spool 47b by the control pressure Pc fed back to the selection control valve 47 and the solenoid pressure from the circuit 57. Thus, the control pressure Pc may be set to an arbitrary pressure between 0 and the line pressure PL, which may be a source pressure, by performing the above-described duty control (0 to pilot pressure Pp) of the solenoid pressure supplied to the circuit 57 by the selection control solenoid 52.

The shifting oil-pressure control circuit (i.e., the control circuit for controlling the shifting oil pressures Pf and Pr for engaging and disengaging the forward clutch 8 the reverse brake 9) may be installed in a control valve body 1b (see FIG. 1) together with other transmission control hydraulic circuits and a lock-up control hydraulic circuit for the V-belt type continuously variable transmission 1.

Referring back to FIG. 1, which shows the selection actuator 42 for the manual valve 41, the selection switch solenoid 51 for the selection switch valve 46, the selection control solenoid 52 for the selection control valve 47, and a shift solenoid 58 in the control valve body 1b. The shift solenoid 58 may be for a transmission control valve (not shown) for determining the transmission control pressure in the cylinder chamber 10b of the primary pulley 10 (see FIG. 2) to perform the transmission control operation. The shifting oil-pressure control operation for the V-belt type continuously variable transmission 1 may be performed by a transmission controller 22 using the selection actuator 42, the selection switch solenoid 51, and the selection control solenoid 52. The transmission controller 22 may also perform the transmission control operation of the V-belt type continuously variable transmission 1 using the shift solenoid 58.

The transmission controller 22 may receive a selector lever position (selection operation) signal from the operation pattern 21 of the selector lever 1a; a signal from a vehicle speed sensor 23 which may detect a vehicle speed VSP; a signal from an accelerator position sensor 24 which may detect a depression amount of an accelerator pedal (accelerator position) APO; a signal from a forward clutch pressure sensor 25 which may detect an engagement pressure (forward shifting oil pressure) Pf of the forward clutch 8; a signal from a reverse brake pressure sensor 26 which may detect an engagement pressure (reverse shifting oil pressure) Pr of the reverse brake 9; a signal from an input rotation sensor 27 which may detect a rotational speed Nin of the transmission input shaft 3; and a signal from a primary pulley rotation sensor 28 which may detect a rotational speed Npri of the primary pulley 10.

The transmission controller 22 may perform the transmission control operation and the shifting oil-pressure control operation of the V-belt type continuously variable transmission 1 through the control valve body 1b on the basis of the above-mentioned input information.

First, the transmission control operation will be described. The transmission controller 22 may receive a signal from one of the range switches 22p, 22r, 22n, and 22d depending on the selection operation position (P, R, N, or D) of the selector lever 1a, and may drive the selection actuator 42 to move the spool 41a of the manual valve 41 to the corresponding one of the park (P) range position, the reverse (R) range position, the neutral (N) range position, and the forward automatic gearshift (D) range position.

Referring again to FIG. 3, when the manual valve 41 is at the neutral (N) range, the selection hydraulic circuit 43 may be connected to a closed space between the lands of the spool 41a at either end thereof. Accordingly, the selection oil pressure Ps may be prevented from being drained. In addition, the forward shifting hydraulic circuit 44 and the reverse shifting hydraulic circuit 45 may be connected to the drain ports 41b and 41c, respectively, so that the engagement pressure of the forward clutch 8 (forward shifting oil pressure Pf) and the engagement pressure of the reverse brake 9 (reverse shifting oil pressure Pr) may be released through the drain ports 41b and 41c. Thus, both the forward clutch 8 and the reverse brake 9 may be set to a disengaged state and the V-belt type continuously variable transmission 1 may be set to a neutral state in which power may not be transmitted.

When the manual valve 41 is at the forward automatic gear-shift (D) range position, the forward shifting hydraulic circuit 44 may be disconnected from the drain port 41b and may be connected to the selection hydraulic circuit 43 so that the selection oil pressure Ps may be supplied to the forward clutch 8. As a result, the engagement pressure of the forward clutch 8 (forward shifting oil pressure Pf) may be generated and the forward clutch 8 may be set to an engaged state.

At this time, the reverse shifting hydraulic circuit 45 may be continuously connected to the drain port 41c, so that the engagement pressure of the reverse brake 9 (reverse shifting oil pressure Pr) may be released through the drain port 41c and the reverse brake 9 may be continuously set to the disengaged state. Because the reverse brake 9 may be disengaged and the forward clutch 8 may be engaged, the V-belt type continuously variable transmission 1 may be set to a state in which forward rotational power can be transmitted.

When the manual valve 41 is at the reverse (R) range position, the reverse shifting hydraulic circuit 45 may be disconnected from the drain port 41c and may be connected to the selection hydraulic circuit 43 so that the selection oil pressure Ps is supplied to the reverse brake 9. As a result, the engagement pressure of the reverse brake 9 (reverse shifting oil pressure Pr) may be generated and the reverse brake 9 may be set to an engaged state.

At this time, the forward shifting hydraulic circuit 44 may be continuously connected to the drain port 41b, so that the engagement pressure of the forward clutch 8 (forward shifting oil pressure Pt) may be released through the drain port 41b and the forward clutch 8 may be continuously set to the disengaged state. Because the forward clutch 8 may be disengaged and the reverse brake 9 may be engaged, the V-belt type continuously variable transmission 1 may be set to a state in which reverse rotational power may be transmitted.

When the spool 41a of the manual valve 41 is moved further downward beyond the reverse (R) range position and reaches the park (P) range position, the upper land of the spool 41a may block the selection hydraulic circuit 43. In addition, the forward shifting hydraulic circuit 44 and the reverse shifting hydraulic circuit 45 may be connected to the drain ports 41b and 41c, respectively, so that the engagement pressure of the forward clutch 8 (forward shifting oil pressure Pf) and the engagement pressure of the reverse brake 9 (reverse shifting oil pressure Pr) may be released through the drain ports 41b and 41c. Thus, both the forward clutch 8 and the reverse brake 9 may be set to a disengaged state and the V-belt type continuously variable transmission 1 may be set to a neutral state in which power may not be transmitted.

When the selector lever 1a is at the D range position, the manual valve 41 may be electronically controlled by the transmission controller 22 so as to be positioned at the corresponding D range position. In the state where the forward clutch 8 may be engaged and the reverse brake 9 may be disengaged so that the V-belt type continuously variable transmission 1 may be set to a state in which forward rotational power can be transmitted, the transmission controller 22 may determine a target input rotational speed (target transmission gear ratio) appropriate for the current driving state. The target input rotational speed may be determined using a transmission map based on the vehicle speed detected by the sensor 23 and the accelerator position detected by the sensor 24. A transmission command for achieving the target input rotational speed may be supplied to the shift solenoid 58, thereby performing a continuously variable transmission operation such that the current input rotational speed Nin approaches the target input rotational speed.

When the selector lever 1a is at the R range position, the manual valve 41 may be electronically controlled by the transmission controller 22 so as to be positioned at the corresponding R range position. In this state, when the forward clutch 8 is disengaged and the reverse brake 9 is engaged so that the V-belt type continuously variable transmission 1 may be set to a state in which reverse rotational power may be transmitted, the transmission controller 22 may supply a transmission command for achieving a reverse-diving input rotational speed corresponding to the lowest transmission gear ratio to the shift solenoid 58. Thus, the V-belt type continuously variable transmission 1 is set to a state in which reverse rotational power may be transmitted at a fixed rotational speed ratio.

When the R range is selected, the forward clutch 8 may be disengaged and the reverse brake 9 may then be engaged so that the V-belt type continuously variable transmission 1 may set to the state in which reverse rotational power can be transmitted. In this state, if the driver performs a selection operation of successively shifting the selector lever 1a from the R range position to the N range position and then to the D range position, the transmission controller 22 may perform a control program (see FIG. 4).

Figure 4:
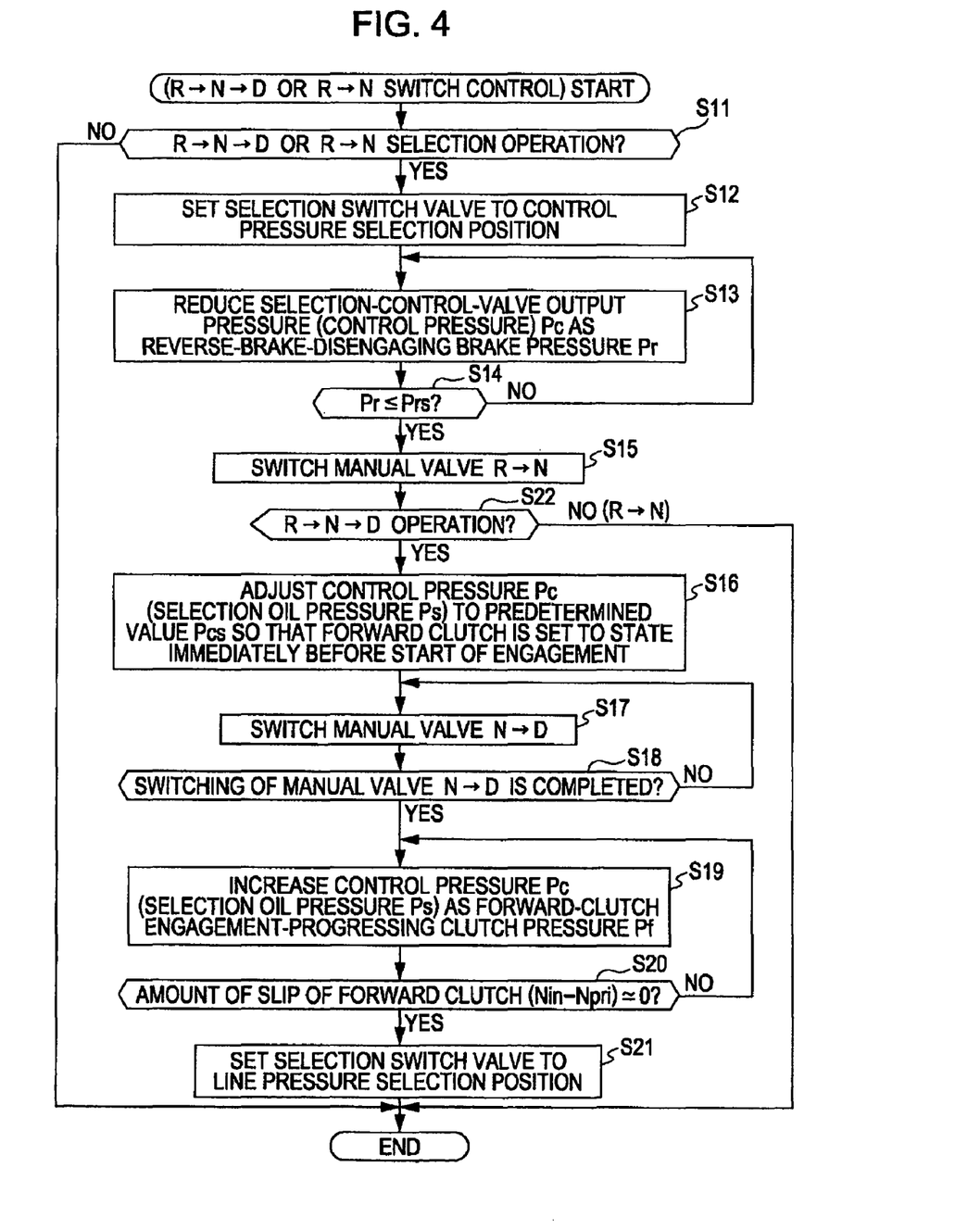
FIG. 4 is a flowchart of a shifting oil-pressure control program executed by a transmission controller shown in FIG. 1 when an R→N→D selection operation is performed, in accordance with embodiments of the present disclosure.
Figure 5:
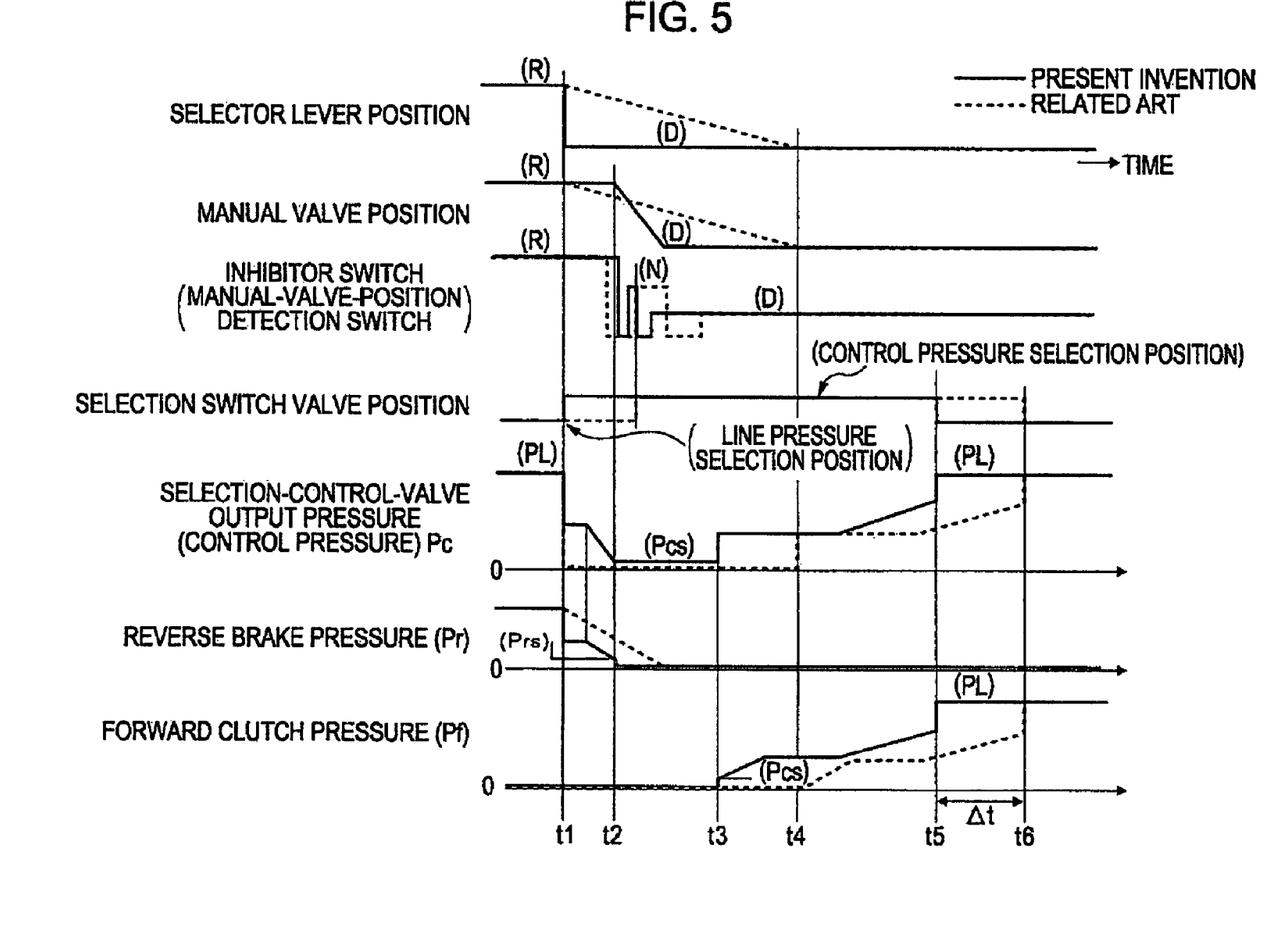
FIG. 5 is an operation time chart of a shifting oil-pressure control process performed in accordance with the program shown in shown in FIG. 4 when the R→N→D selection operation shown is performed, in accordance with embodiments of the present disclosure.

Referring to FIG. 5, an operation time chart of a shifting oil-pressure control process performed in accordance with the program shown in shown in FIG. 4 when the R→N→D selection operation shown is performed, is shown.

In step S11, it may be determined whether or not the R→N→D selection operation or the selection operation may be performed. If the R→N→D selection operation is performed by shifting the selector lever 1a at time t1, it may be determined that the R→N→D selection operation or the R→N selection operation has been performed in step S11, and the control process proceeds to step S12. In step S12, the solenoid 51 is turned ON so that the selection switch valve 46 may be moved from the line-pressure selection position to the control-pressure selection position, as represented by the solid line in FIG. 5. As a result, the selection oil pressure Ps of the circuit 43 may be set to be equal to the control pressure Pc of the circuit 49.

However, the manual valve 41 may not be moved from the current valve position, and may not yet operated in response to the R→N→D selection operation. Instead, the manual valve 41 may be maintained at the R range position, such that the reverse shifting hydraulic circuit 45 may be continuously connected to the selection hydraulic circuit 43. As a result, the pressure values may all be equal, such that Pr=Ps=Pc.

Next, in step S13, duty control of the solenoid 52 may be performed to reduce the control pressure Pc output from the selection control valve 47, as shown by the solid line in FIG. 5. Thus, the control pressure Pc may be used as the pressure for disengaging the reverse brake 9 (as the reverse brake pressure Pr). Accordingly, the reverse brake pressure (reverse shifting oil pressure) Pr may be subjected to arbitrary active control (sequential reduction control) using the selection control valve 47 by performing the duty control of the solenoid 52, as shown by the solid line in FIG. 5 from the time t1 at which the selection operation is performed.

Thus, when the R→N→D selection operation is performed at time t1, first, the reverse brake 9 may be disengaged in response to the selection operation of switching from one of the driving ranges to the N range, which is the non-driving range. At this time, reduction of disengagement shock (selection shock) of the reverse brake 9 and improvement of disengagement response (selection response) of the reverse brake 9, which conflict each other, may be satisfied at the same time in a well-balanced manner.

In a general system according to the related art, when the manual valve is operated in response to the selection operation, the manual valve may be mechanically operated. As illustrated, the manual valve position may move in accordance with the selector lever position. Therefore, the control pressure Pc, which may be an output from the selection control valve, may be instantaneously reduced to 0 at the time t1 when the selection operation is performed (as indicated by the dashed line in FIG. 5). Therefore, the reverse brake pressure Pr may be reduced using a flow-rate regulator, such as an orifice, as also indicated by the dashed line in FIG. 5. Therefore, unlike the present embodiment, the reverse brake pressure Pr cannot be subjected to arbitrary active control (sequential reduction control).

Referring briefly to FIG. 4, in step S14 it may be determined whether or not the reverse brake pressure Pr, which may be reduced by the above-described active control (sequential reduction control), may be equal to or less than a set value Prs. The set value Prs may be a criterion for determining that the disengagement shock of the reverse brake 9 will not occur even if the reverse brake pressure Pr is instantaneously reduced without control.

Continuing with FIG. 5, after the reverse brake pressure Pr reaches the set value Prs at time t2, the disengagement shock of the reverse brake 9 will not occur even if the reverse brake pressure Pr is instantaneously reduced without control. Therefore, the control process may proceed to step S15 from step S14. In step S15, the manual valve 41 may be moved from the R range position to the N range position by the selection actuator 42, as shown by the solid line in FIG. 5.

When the manual valve 41 is moved to the N range position, the reverse shifting hydraulic circuit 45 may be connected to the drain port 41c so that the engagement pressure of the reverse brake 9 (reverse shifting oil pressure Pr) may be released through the drain port 41c. Therefore, the reverse brake pressure Pr may be instantaneously reduced to 0 at time t2, as shown by the solid line in FIG. 5. Accordingly, the reverse brake 9 may be reliably and quickly disengaged and delay in the disengagement of the reverse brake 9 may be prevented.

While it may be determined that the reverse brake pressure Pr is not yet reduced to the set value Prs in step S14 (i.e., in a time period before time t2 in FIG. 5), the disengagement shock of the reverse brake 9 may occur if the reverse brake pressure Pr is instantaneously reduced without control. Therefore, the control process may return to step S13 and the reverse brake pressure Pr may be reduced under the active control (sequential reduction control) until Pr<Prs is satisfied.

Even when the manual valve 41 is set to the N range position as described above, because the manual valve 41 is entirely closed by connecting the selection hydraulic circuit 43 to the closed space between the lands of the spool 41a, the selection oil pressure Ps of the selection hydraulic circuit 43 may be continuously controlled using the selection control valve 47 (control pressure Pc) by the solenoid 52.

In the case where the R→N selection operation is performed (step S22), it is not necessary to perform the operation of shifting to the D range. Therefore, the control process may be ended.

In the case where the R→N→D selection operation is performed (step S22), an operation of preparing for the switching from the N range to the D range may be performed (see step S16 in FIG. 4) immediately after the time t2 at which manual valve 41 may be set to the N range position. More specifically, as shown by the solid line in FIG. 5, the control pressure Pc supplied to the circuit 49, which may be equal to the selection oil pressure Ps supplied to the circuit 43, may be set to a predetermined value Pcs using the control valve 47 by performing the duty control of the solenoid 52. The predetermined value Pcs may be set to a pressure necessary for reducing a gap between clutch discs of the forward clutch 8 in the disengaged state so that the forward clutch 8 may be set to a state immediately before the start of engagement.

Then, in step S17, the operation of shifting the manual valve 41 from the N range position to the D range position may be started. Then, in step S18, it may be determined whether or not the operation of shifting the manual valve 41 from the N range position to the D range position may be completed.

Step S17 may be continuously performed until the operation of shifting the manual valve 41 from the N range position to the D range position is completed. When the operation of shifting the manual valve 41 from the N range position to the D range position is completed at time t3, the control process may proceed to step S19.

In step S19, duty control of the solenoid 52 may be performed so as to increase the control pressure Pc (selection oil pressure Ps) as the pressure for progressing the engagement of the forward clutch 8 (as the forward clutch pressure Pf), as shown by the solid line in FIG. 5.

When the manual valve 41 is shifted to the D range position as described above, the control pressure Pc (selection oil pressure Ps), which may be increased in the above-described manner, may be supplied from the circuit 49 to the forward clutch 8 through the circuits 43 and 44. Accordingly, the forward clutch pressure Pf may be increased after time t3, and the forward clutch 8 may be engaged by the forward clutch pressure Pf.

Referring back to FIG. 4, in step S20 it may be determined whether or not the amount of slip (i.e., the difference between the input rotational speed Nin and the rotational speed Npri of the primary pulley) of the forward clutch 8 may be reduced to substantially 0, regardless of whether or not the engagement of the forward clutch 8 is substantially completed. If it is determined that the amount of slip of the forward clutch 8 is not yet reduced to 0, the control process may return to step S19 and the step of progressing the engagement of the forward clutch 8 may be continued. If it is determined that the amount of slip of the forward clutch 8 is reduced to substantially 0 in step S20, the solenoid 51 may be turned OFF in step S21 so that the selection switch valve 46 may be set to the line-pressure selection position (see FIG. 3).

Accordingly, the selection switch valve 46 may supply the line pressure PL of the circuit 48 to the circuit 43, such that the selection oil pressure Ps may become equal to the line pressure PL. Therefore, the forward clutch pressure Pf may be instantaneously increased to the line pressure PL at time t5 (see FIG. 5, as shown by the solid line), and the forward clutch 8 may be completely engaged.

Thus, the process of controlling the forward shifting oil pressure Pf in response to the N→D selection operation from the N range (non-driving range) to the D range (one of driving ranges) may be performed continuously after the process of controlling the reverse shifting oil pressure Pr in response to the R→N selection operation from the R range (the other one of driving ranges) to the N range (non-driving range). In the process of controlling the forward shifting oil pressure Pf in response to the N→D selection operation, the selection oil pressure Ps (=Pc=Pcs), which may remain when the manual valve is shifted from the R range position to the N range position and which may be controlled at the oil pressure Pcs necessary for setting the forward clutch 8 to the state immediately before the start of engagement, may be used as the initial engagement pressure of the forward clutch 8 (see Pf=Pcs at time t3 in FIG. 5). Therefore, delay in the engagement of the forward clutch 8 (i.e., degradation of the shift response) may be prevented.

In the system according to the related art, at time t4 when the manual valve, which may be operated in accordance with the selector lever position, may be shifted to the D range position, the forward clutch pressure (forward shifting oil pressure) Pf may be increased from 0, as shown by the dashed line in FIG. 5. Therefore, the engagement of the forward clutch 8 may not be completed until time t6. In contrast, according to embodiments disclosed herein, the time at which the engagement of the forward clutch 8 may be completed may be made earlier by ΔT. Thus, the above-described and other advantages may be obtained.

In one embodiment, after time t3 at which the manual valve 41 may be shifted from the N range position to the D range position, the engagement of the forward clutch 8 may be actively controlled sequentially in any manner by increasing the control pressure (=selection oil pressure Ps) using the solenoid 52. This is clear from the sequence variation of the forward clutch pressure (forward shifting oil pressure) Pf shown by the solid line in FIG. 5. Accordingly, reduction of engagement shock (selection shock) of the forward clutch 8 and improvement of engagement response (selection response) of the shifting friction element, which conflict each other, may be satisfied at the same time in a well-balanced manner.

Although only the R→N→D selection operation is explained with reference to FIG. 4, when the D→N→R selection operation or the D→N selection operation is performed, similar effects may be obtained by performing a shifting oil-pressure control operation similar to that shown in FIG. 4.

In these embodiments, the selection oil pressure Ps may be selectively switched between the line pressure PL, which may be the transmission control source pressure of the automatic transmission, and the control pressure Pc, which may be obtained by adjusting the line pressure PL with the selection control valve 47, which may function as a selection-oil-pressure controller. Therefore, even if the selection control valve 47 or the control system thereof (solenoid 52) malfunctions and the control pressure Pc may not be generated, the selection oil pressure Ps may become equal to the line pressure PL and the worst situation in which power cannot be transmitted by the automatic transmission 1 may be avoided.

As shown in the figure, the automatic transmission may be the V-belt type continuously variable transmission 1. However, similar operational effects may also be obtained when embodiments disclosed herein are applied to a planetary-gear-set type multi-range automatic transmission, an automatic manual transmission, or other types of transmissions.

In the case embodiments disclosed herein may apply to the planetary-gear-set type multi-range automatic transmission, the shifting friction element may be a friction element for selecting a forward first gear position and a friction element for selecting a reverse gear position. In the case where embodiments disclosed herein may apply to the automatic manual transmission, the shifting friction element may be an automatic clutch for selecting the forward first gear position and an automatic clutch for selecting the reverse gear position.

As shown in by FIG. 5, the time t2 at which the manual valve 41 may be shifted from the R range position to the N range position may be set to the time when it is determined that the disengagement shock of the reverse brake 9 will not occur even if the engagement pressure of the reverse brake 9 (reverse shifting oil pressure) Pr is instantaneously drained without control. However, the time t2 at which the manual valve 41 may be shifted from the R range position to the N range position may also be set to the time after a predetermined period, which may be set for a similar purpose, from the time t1 at which the selection operation is performed.

According to these embodiments, the time at which the range position of the manual valve 41 may be shifted in response to the R→N selection, operation may be delayed from time t1 to time t2 so that the reverse brake pressure (reverse shifting oil pressure) Pr may be actively controlled sequentially. In this case, there may be a risk that the delay in the disengagement of the reverse brake 9 may cause a problem when the temperature is very low and the viscosity of the operating oil of the automatic transmission is high.

Therefore, when the temperature is very low, the control program may be ignored and the range position of the manual valve 41 may be shifted in response to the R→N selection operation without delay. More specifically, the manual valve 41 may be shifted to the N range position at the time when the R→N selection operation is performed so that the reverse brake pressure (reverse shifting oil pressure) Pr may be released from the drain port 41c of the manual valve 41 at the time when the R→N selection operation is performed. Thus, the above-described problem caused by the delay in the disengagement of the reverse brake 9 may be avoided.

An advantage of embodiments disclosed herein may provide a shifting oil-pressure control apparatus for an automatic transmission which has the structure in which a common oil-pressure control valve is used to selectively supply a controlled pressure to a forward shifting friction element or a reverse shifting friction element under distribution control performed by the manual valve so that costs can be reduced, and which can avoid the above-described various problems and the above-described new problem at the same time.

Advantageously, when the selection operation is performed, reduction of disengagement shock (selection shock) of the shifting friction element and improvement of disengagement response (selection response) of the shifting friction element, which conflict each other, may be satisfied at the same time in a well-balanced manner. In addition, when the process of disengaging the shifting friction element reaches a predetermined state, the shifting oil pressure is instantaneously released from the drain port of the manual valve which is shifted to the non-driving range. Thus, the shifting friction element may be reliably and quickly set to a completely disengaged state.

While the disclosure has been presented with respect to a limited number of embodiments, those skilled in the art, having benefit of this disclosure, will appreciate that other embodiments may be devised which do not depart from the scope of the present disclosure. Accordingly, the scope of the embodiments disclosed herein should be limited only by the attached claims.

What is claimed is:

1. A control apparatus of a vehicle transmission, comprising:
   a hydraulic circuit configured to activate at least one friction element with a control pressure;
   a selector configured to select a range of the transmission;
   a valve configured to switch a transmission shifter; and
   a control unit configured: to direct the valve to switch the transmission shifter in response to the selected transmission range; and to reduce the control pressure prior to switching the transmission shifter.

2. The control apparatus of claim 1, wherein the control unit is further configured to reduce the control pressure prior to switching the transmission shifter from a driving range to a non-driving range.

3. The control apparatus of claim 1, wherein the control unit is further configured to reduce control pressure prior to switching the transmission shifter from a non-driving range to a driving range.

4. The control apparatus of claim 1, wherein the control unit is configured to increase the control pressure after the transmission shifter is switched.

5. The control apparatus of claim 1, further comprising:
a first friction element corresponding to at least one forward driving range;
a second friction element corresponding to at least one reverse driving range; and
wherein the control unit is configured:
to reduce a first control pressure to the first friction element prior to switching the transmission shifter from a forward driving range to a reverse driving range; and
to increase a second control pressure to the second friction element after switching the transmission shifter to the reverse driving range.

6. The control apparatus of claim 1, further comprising:
a first friction element corresponding to at least one forward driving range; and
a second friction element corresponding to at least one reverse driving range;
wherein the control unit is configured:
to reduce a second control pressure to the second friction element prior to switching the transmission shifter from a reverse driving range to a forward driving range; and
to increase a first control pressure to the first friction element after switching the transmission shifter to the forward driving range.

7. The control apparatus of claim 1, further comprising a line pressure circuit and a selection valve switch to hydraulically reduce the control pressure in response to signals from the control unit.

8. A method to control a vehicle transmission, the method comprising:
activating at least one friction element with a control pressure;
selecting a desired range of the transmission;
switching a transmission range in response to the selected desired transmission range; and
reducing the control pressure prior to switching the transmission range.

9. The method of claim 8, further comprising reducing the control pressure prior to switching the transmission range from a driving range to a non-driving range.

10. The method of claim 8, further comprising reducing the control pressure prior to switching the transmission range from a non-driving range to a driving range.

11. The method of claim 8, further comprising increasing the control pressure after the transmission range is switched.

12. The method of claim 8, further comprising:
reducing a first control pressure to a first friction element prior to switching the transmission range from a forward driving range to a reverse driving range; and
increasing a second control pressure to a second friction element after switching the transmission range to the reverse driving range.

13. The method of claim 8, further comprising:
reducing a second control pressure to a second friction element prior to switching the transmission range from a reverse driving range to a forward driving range; and
increasing a first control pressure to a first friction element after switching to the forward driving range.

14. The method of claim 8, further comprising reducing the control pressure with a line pressure circuit and a selection valve switch.

15. A control apparatus of a transmission, comprising:
a hydraulic circuit configured to activate at least one friction element with a control pressure;
a means for selecting a range of the transmission;
a means for shifting the transmission;
a means for directing a valve means to switch the means for shifting the transmission in response to the selected transmission range; and
a means for reducing the control pressure prior to switching the means for shifting.

16. The control apparatus of claim 15, further comprising a means for reducing the control pressure prior to switching the means for shifting from a driving range to a non-driving range.

17. The control apparatus of claim 15, further comprising a means for reducing the control pressure prior to switching the means for shifting from a non-driving range to a driving range.

18. The control apparatus of claim 15, further comprising a means for increasing the control pressure after the means for shifting is switched.

19. The control apparatus of claim 15, further comprising:
a first friction element corresponding to at least one forward driving range;
a second friction element corresponding to at least one reverse driving range; and
a means for reducing a first control pressure to the first friction element prior to switching the means for shifting from a forward driving range to a reverse driving range; and
a means for increasing a second control pressure to the second friction element after switching the means for shifting to the reverse driving range.

20. The control apparatus of claim 15, further comprising:
a first friction element corresponding to at least one forward driving range; and
a second friction element corresponding to at least one reverse driving range;
a means for reducing a second control pressure to the second friction element prior to switching the means for shifting from a reverse driving range to a forward driving range; and
a means for increasing a first control pressure to the first friction element after switching the means for shifting to the forward driving range.

* * * * *